No. 684,319. Patented Oct. 8, 1901.
F. G. SHORT.
APPARATUS FOR TREATING MILK, CREAM, OR OTHER LIQUIDS.
(Application filed Jan. 13, 1899.)
(No Model.)
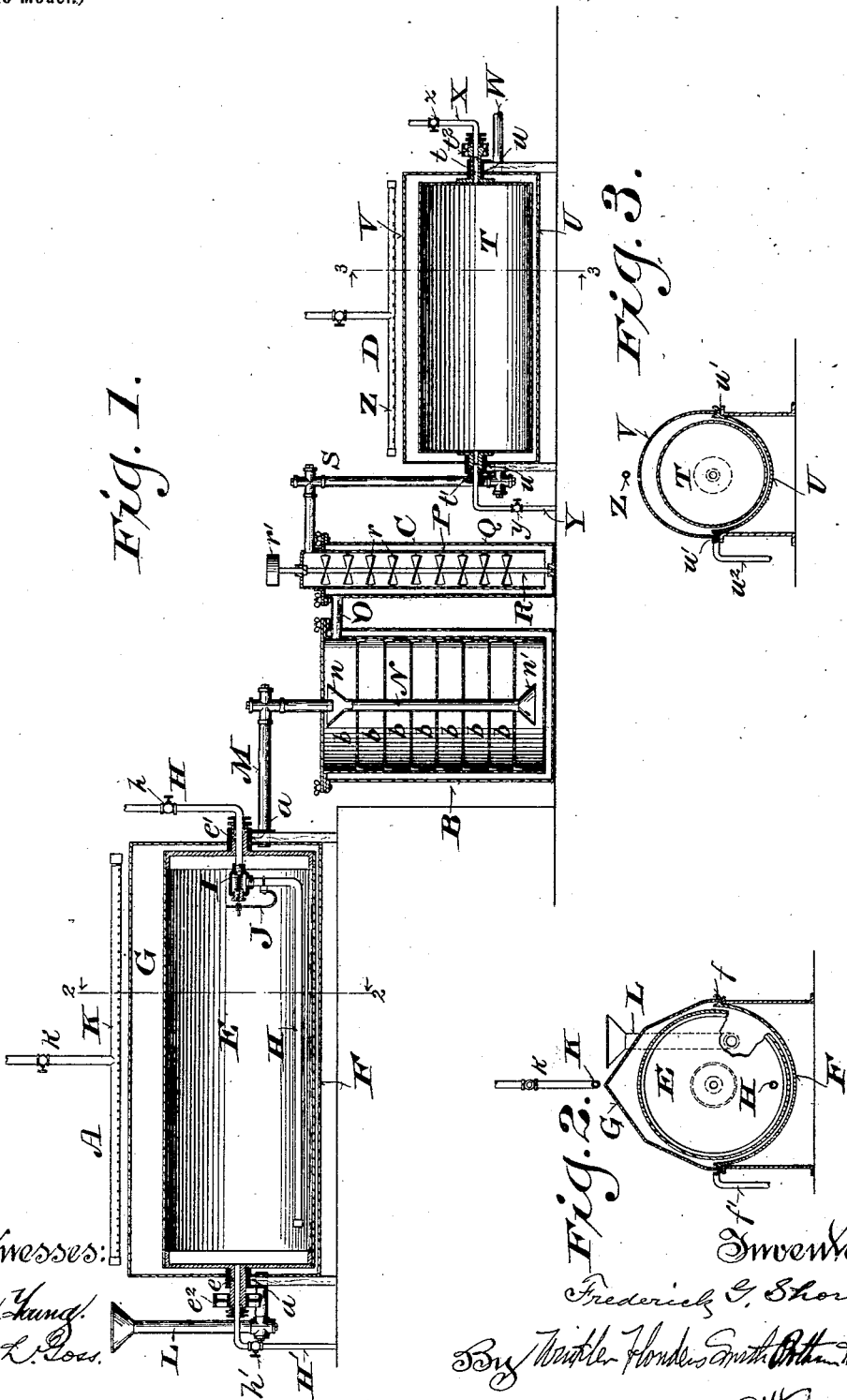

UNITED STATES PATENT OFFICE.

FREDERICK G. SHORT, OF FORT ATKINSON, WISCONSIN.

APPARATUS FOR TREATING MILK, CREAM, OR OTHER LIQUIDS.

SPECIFICATION forming part of Letters Patent No. 684,319, dated October 8, 1901.

Application filed January 13, 1899. Serial No. 702,028. (No model.)

*To all whom it may concern:*

Be it known that I, FREDERICK G. SHORT, a citizen of the United States, residing at Fort Atkinson, in the county of Jefferson and State of Wisconsin, have invented a certain new and useful Apparatus for Treating Milk, Cream, or other Liquids, of which the following is a specification, reference being had to the accompanying drawings, forming a part thereof.

The main objects of my invention are by a continuous process to pasteurize or heat milk, cream, or other liquids, to remove taints and offensive odors therefrom, to prevent overheating, by which a cooked taste is imparted to the milk, to restore to milk or cream the body or consistency which it loses by being subjected to a pasteurizing temperature, and to avoid contamination by contact with the outside air.

It consists in certain novel features in the construction and arrangement of component parts of apparatus, as hereinafter described and claimed.

In the accompanying drawings like letters designate the same parts in the several figures.

Figure 1 is a vertical longitudinal section of apparatus embodying my invention. Fig. 2 is a vertical cross-section on the line 2 2, Fig. 1, of the heater; and Fig. 3 is a similar section on the line 3 3, Fig. 1, of the cooler.

With the methods or processes and apparatus heretofore employed for pasteurizing milk or cream it has generally been heated in a body, either in an open or closed vessel, to the required temperature and held in that condition for a sufficient length of time to effect the desired result; but this method is slow, inconvenient, and uncertain as to its results, since the milk or cream has to be maintained at a pasteurizing temperature of about 157° Fahrenheit for about twenty minutes, and it is difficult to maintain a constant and uniform temperature throughout a large body or volume. If the milk or cream is heated materially above that temperature, the albumen of the milk is partially cooked, which gives the milk or cream an objectionable cooked taste. If the temperature is below the required degree for pasteurization, the desired result will not be secured.

With my improved apparatus I am enabled to subject milk, cream, or other liquid to a pasteurizing temperature for a sufficient length of time to secure the desired result, to remove taints and offensive odors, to restore the body or consistency of the milk or cream, and to cool it to the desired temperature in a continuous operation without contamination by exposure to the atmosphere and without danger of either over or under heating.

In the operation of my apparatus the milk, cream, or other liquid is passed in an unconfined film or thin stratum over a surface heated to and maintained at a constant pasteurizing temperature, allowing the steam or vapor which is produced at this temperature to escape and carry with it any taints or offensive odor that may be contained in the milk, cream, or other liquid. It is then held in a body at the temperature to which it has been raised for about twenty minutes. It is next beaten or violently agitated to restore its consistency or body, and finally it is cooled down to the desired temperature without exposure to contamination by contact with the outside air.

Referring to the accompanying drawings, which show apparatus embodying my invention, A designates a heater for continuously subjecting the milk or other liquid in an unconfined film or thin stratum to a pasteurizing temperature and allowing the steam or vapor given off at that temperature to carry with it any taints or offensive odor.

B is a holder, in which the milk or other liquid is collected in a body and held at the pasteurizing temperature for a sufficient length of time (about twenty minutes) to destroy any germs or bacteria or render them innocuous.

C is a beater, in which milk or cream is beaten or violently agitated to restore its body or consistency after it has been heated, and D is a cooler, in which the temperature of the milk or other liquid is reduced to the desired degree.

The heater consists of a hollow rotary cylinder E, a tank or trough F, into which the lower part of said cylinder projects, and a hood G, covering and inclosing the upper part of the said cylinder above said trough. The cylinder E has closed ends, which are provided with hollow trunnions $e\ e'$, supported and adapted to turn in bearings $a\ a$. The trough F is made of semicylindrical shape corresponding with the lower part of the cylinder E, between which and said trough there is a space of about a quarter of an inch or less. Around its upper edges the trough is formed or provided with a gutter $f$, as shown in Fig. 2, and in this gutter the lower edges of the hood G are fitted and hermetically sealed by water or other liquid. An overflow-pipe $f'$ may be provided, as shown in Fig. 2, to carry off the surplus sealing liquid. The hood G may be made arch or roof shaped, as shown, or semicylindrical, and it sits loosely at its lower edges in the gutter $f$, so that it may be removed from the trough at any time, thus affording ready and free access to the interior of the heater for the purpose of cleansing the same from time to time.

H is a steam-pipe provided with a valve $h$ and passing through the hollow trunnion $e'$ into the cylinder E, within which it is extended downwardly and then horizontally nearly the whole length of said cylinder. The lower horizontal part of this pipe inside of said cylinder is perforated to allow steam to escape at different points therein into the cylinder.

I is a valve constructed and arranged to be opened and closed by a thermostatic expansion-strip J, located within the cylinder E for automatically admitting and shutting off steam to and from said cylinder, according to the temperature therein.

H' is an outlet or waste pipe provided with a valve $h'$ and passing from the interior of cylinder E through the trunnion $e$.

K is a perforated pipe having a water-supply connection $k$ and extending horizontally along and over the apex or top of the hood G for the purpose of condensing the steam or vapor which rises therein from the film of liquid on the upper part of the cylinder F.

L is a feed-spout opening into one end of the trough F for supplying milk or other liquid to be treated to the heater, and M is a discharge-pipe leading out of the opposite end of the trough F.

The cylinder E is turned by means of a pulley $e^2$, mounted on its trunnion $e$ outside of the trough F.

The holder B consists of a closed tank or receptacle provided with a series of perforated baffle-plates $b\ b$, arranged horizontally therein one above another, and of a pipe N, passing vertically through the baffle-plates and provided with funnel or bell shaped ends $n\ n'$. The pipe M, which passes through the cover or top of the holder, terminates in or over the upper flaring end $n$ of the pipe N. The lower flaring or bell-shaped end $n'$ of said pipe N, which extends below the lower baffle-plate, serves to spread the milk or other liquid flowing therefrom. The tank or receptacle is provided with a jacket to prevent radiation and loss of heat from the contents of the holder, which is made of sufficient size to cause the milk or other liquid to flow slowly through it and to remain therein a sufficient time (about twenty minutes) to destroy or render innocuous any germs or bacteria contained in the liquid. The holder may be conveniently made of two sheet-metal cylinders fitted one within the other so as to leave a space between them at the bottom and sides. The space between the two cylinders may be supplied with a heating medium, if desired, to maintain the desired temperature of the contents of the inner cylinder; but this is not necessary under ordinary conditions. The cover of the holder, the baffle-plate $b$, and the pipe N are made removable, so that easy access may be had to the interior of the holder and the several parts thereof for cleansing them.

O is the outlet-pipe of the holder, leading from the upper part of the inner cylinder into the upper part of the beater C, so that the milk or other liquid conducted through the pipe N into the lower part of the holder has to pass upwardly through the several baffle-plates $b$, by which it is distributed and retarded in its progress to the upper part of the holder before it can escape therefrom.

The beater C consists of an inner vertical cylinder P, open at its lower end, an outer cylinder Q, surrounding it and forming an annular space, which communicates at the bottom with the inner cylinder through its open end and into the upper end of which the pipe O opens, and a shaft R, provided with inclined or spiral blades or wings $r$ and passing axially through the inner cylinder. The shaft R has a step-bearing at its lower end on the bottom of the outer cylinder Q and a bearing at its upper end in the upper end of the inner cylinder P, which extends above the outer cylinder. The beater-shaft is turned by means of a pulley $r'$, attached to its upper end. The several parts of the beater are made so that they can be readily detached and removed from each other for the purpose of cleansing them. The inner cylinder P may be formed or provided near its upper end with an outwardly-projecting flange, by which it may be attached to the upper end of the outer cylinder Q, so as to close the annular space between them, as shown in Fig. 1. From the upper end of the inner cylinder P a pipe S leads into the cooler D. The cooler may, like the heater A, consist of a hollow rotary cylinder T, a tank or trough U, and a hood or cover V. The ends or heads of the cylinder T are formed or provided with hollow trunnions $t\ t'$, by which it is supported and adapted to turn in suitable bearings $u\ u$. The tank or trough U conforms in shape with the lower part of said cylinder and is provided at the top with a gutter $u'$, in which the lower edges of the arch-shaped hood or cover V are loosely held and sealed by water or other sealing liquid. A waste-pipe $u^2$ may be provided, as shown in Fig. 3, to conduct off surplus sealing liquid and to prevent its overflowing said gutter. The cylinder T is turned by means of a pulley $t^2$, mounted on one of its trunnions $t$. The pipe S opens into one end of the trough U, and a pipe W for drawing off the cooled milk or other liquid leads out of the other end of said trough. A pipe X, provided with a valve $x$, for supplying cold or cool water to the cylinder T passes through the hollow trunnion $t$, and a pipe Y, provided with a valve $y$, for carrying off the water leads out of said cylinder through its hollow trunnion $t'$.

Z is a perforated pipe extending over the hood V for supplying cooling-water thereto.

The cylinder E is filled or partially filled with water, which may be introduced through the pipe H when the apparatus is cool, and the water is heated by steam supplied through said pipe. The desired temperature (about 157° Fahrenheit for pasteurizing milk or cream) is regulated and controlled automatically by the valve I and thermostat J. When the water in the cylinder is heated to the desired degree for which the thermostat is adjusted, the valve I will be automatically closed, shutting off steam from that part of the pipe H within the cylinder E, and when the temperature of the water falls slightly the valve I will be automatically opened, admitting steam into the cylinder. Thus the water with which the cylinder E is filled or supplied and the walls of the cylinder will be maintained at a constant temperature. The milk, cream, or other liquid to be treated is then introduced into the heater in a constant and regular stream through the spout L and, filling the space between the trough F and the lower part of the cylinder E, is carried up in a film or thin stratum over said cylinder, which is turned slowly or at a moderate rate of speed. The small body or volume of milk or other liquid contained in the narrow space between the trough F and the lower part of the cylinder E is thus soon raised to the temperature of the revolving cylinder E and passes at that temperature from the opposite end of the heater through the pipe M into the holder B. The steam or vapor given off from the film or thin stratum of liquid spread over the upper part of the heated cylinder E carries with it any taints or offensive odor that the milk or other liquid may have had and is condensed on the inside of the hood G, which is kept cool by the water flowing over the outside of the hood from the pipe K. The condensed steam or vapor runs down inside the hood into the gutter $f$, where it mingles and is conducted off with the cooling-water, which flows over the outside of the hood, hermetically sealing its lower edges in said gutter. After being thus heated to a pasteurizing temperature the liquid passes into the holder B, in which it is held in a large volume or body at that temperature for a sufficient length of time (about twenty minutes) to effect the desired result by destroying or rendering innocuous germs or bacteria contained in the liquid. From the upper part of the holder the liquid passes through the pipe O into the upper part of the space between the cylinders P and Q of the beater. Flowing downwardly through this space it enters the lower open end of the inner cylinder P and is subjected to the beating action of the wings or blades $r\ r$ for five minutes or more. This operation restores to milk or cream the consistency or body which it has lost by being heated. The wings or blades $r$ are twisted or inclined, so that they tend to elevate the liquid to the upper end of the inner cylinder, from which it flows through the pipe S into the cooler D. The cylinder T of the cooler, being rotated, takes up the liquid from the trough U and exposes it in a film or thin stratum to the space inclosed by the hood V, thus allowing it to rapidly give off its heat and become cooled to the desired temperature. To accelerate the cooling operation and reduce the size of the cooler, cold or cool water may be supplied to the cylinder T and to the outside of the hood V or to either. The lower edges of the hood V are hermetically sealed by the water flowing over the outside of said hood or by the condensed steam or vapor collected inside of the hood. It will be seen that in its passage through the apparatus the milk or other liquid is not exposed to contamination by contact with the outside air, that the several operations in its treatment are carried on continuously without interruption, and that overheating, which produces a cooked taste in milk, is avoided.

The hereinbefore-described apparatus may be advantageously employed for treating milk to facilitate the separation of the cream therefrom.

I claim—

1. In apparatus for treating milk, cream or other liquid, the combination with a trough or tank, a hollow rotary cylinder supported horizontally in said trough, a heat-supply pipe passing into said cylinder through one of its bearings and provided with a valve, and a thermostat arranged to automatically open or close said valve according to the temperature of said cylinder, substantially as and for the purposes set forth.

2. In apparatus for treating milk, cream or other liquid, the combination of a trough or tank having a gutter around the top, a hollow rotary cylinder supported horizontally therein and provided with means for automatically controlling its temperature, and a removable hood for covering said trough and cylinder, adapted to be hermetically sealed around the bottom in said gutter, substantially as and for the purposes set forth.

3. In apparatus for treating milk, cream or other liquid, the combination of a semicylindrical trough or tank having an inlet and an outlet at opposite ends, a hollow rotary cylinder supported horizontally in said trough with a narrow space between them, and a removable hood for covering said trough and cylinder, substantially as and for the purposes set forth.

4. In apparatus for treating milk, cream or other liquid, the combination of a heater consisting of a trough or tank, a hollow rotary cylinder and means for heating said cylinder; and a holder consisting of a closed jacketed tank or receptacle, provided with a series of perforated baffle-plates and with a pipe passing through said baffle-plates from the upper to the lower part of said tank which has an outlet at or near the top, the outlet of the heater being connected with the holder and arranged to discharge into the upper end of the pipe therein, substantially as and for the purposes set forth.

5. In apparatus for treating milk, cream or other liquid, the combination with means for subjecting it continuously in an unconfined film or thin stratum to a heated surface, means for automatically regulating the temperature of said surface, and means for holding the heated liquid in a body at a pasteurizing temperature for the requisite time, of a beater for restoring the body or consistency of the liquid after it has been heated, substantially as and for the purposes set forth.

6. In apparatus for treating milk, cream or other liquid, the combination of a heater constructed and arranged to continuously heat the liquid in an unconfined film or thin stratum, means for catching, condensing and conducting off the vapor given off from the heated liquid, a holder connected with the outlet of the heater constructed and arranged to maintain the liquid in a body at a pasteurizing temperature for the requisite time, a beater connected with the outlet of the holder for restoring the body or consistency of the liquid, and a cooler into which the beater discharges, substantially as and for the purposes set forth.

7. In apparatus for treating milk, cream or other liquid, the combination with a heater of a beater consisting of an inner cylinder open at the bottom and closed at the top, a rotary shaft provided with inclined wings or blades and passing axially through said cylinder, an outer cylinder inclosing a space around the inner cylinder and communicating therewith at the bottom, there being an inlet-opening into the upper part of said space and an outlet-opening out of the upper part of the inner cylinder, substantially as and for the purposes set forth.

8. In apparatus for treating milk the combination with a heater of a cooler consisting of a semicylindrical horizontal trough or tank, a hollow rotary cylinder supported horizontally in said trough with a narrow space between them, and a removable hood for covering said trough and inclosing the upper part of said cylinder, one end of said trough having an inlet and the other end an outlet, substantially as and for the purposes set forth.

In witness whereof I hereto affix my signature in presence of two witnesses.

FREDERICK G. SHORT.

Witnesses:
CHAS. L. GOSS,
C. L. FITCH.